United States Patent [19]
Curtiss

[11] Patent Number: 6,111,768
[45] Date of Patent: Aug. 29, 2000

[54] MULTIPLE VOLTAGE ALTERNATOR SYSTEM

[75] Inventor: William Curtiss, Chelsea, Mass.

[73] Assignee: Ecoair, Corp., Hamden, Conn.

[21] Appl. No.: 09/311,971

[22] Filed: May 14, 1999

[51] Int. Cl.[7] .............................. H02M 7/68; H02P 9/00; H02J 9/06

[52] U.S. Cl. ................................ 363/98; 363/16; 322/28; 307/46; 323/267

[58] Field of Search .................................. 363/16, 17, 98, 363/132; 322/28, 46; 307/10.1, 10.6, 44–46, 64, 66, 68; 323/255, 267

[56] References Cited

U.S. PATENT DOCUMENTS

| | | |
|---|---|---|
| 3,668,514 | 6/1972 | Peck . |
| 4,045,718 | 8/1977 | Gray . |
| 4,153,869 | 5/1979 | Ragály . |
| 4,156,171 | 5/1979 | Kofink . |
| 4,161,684 | 7/1979 | Ragály . |
| 4,491,779 | 1/1985 | Campbell et al. . |
| 4,516,066 | 5/1985 | Nowakowski . |
| 4,555,657 | 11/1985 | Kato et al. . |
| 4,686,442 | 8/1987 | Radomski . |
| 4,748,395 | 5/1988 | Reynolds . |
| 4,816,736 | 3/1989 | Dougherty et al. . |
| 5,013,991 | 5/1991 | Brune . |
| 5,166,538 | 11/1992 | Norton ................................. 307/10.1 |
| 5,210,480 | 5/1993 | Iwatani et al. . |
| 5,373,196 | 12/1994 | Faley ........................................ 307/46 |
| 5,656,922 | 8/1997 | LaVelle et al. . |

OTHER PUBLICATIONS

J. Vincent Hellman of General Motors Corporation and Robert J. Sandel of Ford Motor Company "Dual/High Voltage Vehicle Electrical Systems" SAE Technical Papers Series #911652, Future Transportation Technology Conference and Exposition, Portland, Oregon, Aug. 5–7, 1991. (no month).

J.M. Miller and D. Goel of Ford Motor Company, D. Kaminski and H.P. Schöner of Daimler–Benz AG and T.M. Jahns of Mass. Institute of Technology "Making the Case for the Next Generation Automotive Electrical System" #98C006, pp. 41–50. (no date).

Michael Walther, Richard Schöttke and Klaus Dieterich of Robert Bosch Corporation "Future Electrical Power Supply System" # 98C007 pp. 53–60. (no date).

Stefan Müller and Xaver Pfaf of BMW AG, Munich, Germany "Considerations Implementing a Dual Voltage Power Network" #98C008 pp. 61–70. (no date).

(List continued on next page.)

*Primary Examiner*—Jessica Han
*Attorney, Agent, or Firm*—DeLio & Peterson, LLC

[57] ABSTRACT

A multiple voltage alternator system for directing power in a vehicle between an alternator, a single battery and loads connected thereto which require power at a higher DC voltage and a lower DC voltage. In one embodiment, first and second bi-directional converters operate synchronously and are coupled together through a transformer having first and second windings. The alternator supplies power directly at one voltage and indirectly through the bi-directional converters at the other voltage when the vehicle engine is running. The battery operates at the opposite voltage from the alternator, preferably at the lower voltage, and directly supplies power at one voltage and indirectly at the other voltage when the alternator is not providing power. In an alternative embodiment the bi-directional converters are coupled through an autotransformer. The system is particularly suitable for use with vehicles having engines with electromagnetically operated valves that require less power when starting and more power at higher engine speeds. In yet another embodiment, one way DC to DC down voltage conversion is provided through a transformer, preferably an autotransformer, and engine valves requiring higher DC voltages at high engine speeds are provided with the lower voltage at engine startup through a lower DC voltage to a higher DC voltage bypass circuit.

25 Claims, 2 Drawing Sheets

OTHER PUBLICATIONS

Randy Frank, Robert Meyer and Jeff Reiter of Motorola Semiconductor Products Sector "The Role of Power Electronics in Future Automotive Systems" #98C009 pp. 71–81. (no date).

"Aura Systems Flywheel" @ http://popularmechanics.com/popmech/auto2/9701AUTKBM.html (no date).

"Aura Receives Chrysler Design of Excellence Award for Auragen™ Mobile Generator" ©1998 Aura Systems, Inc., @ http://www. Aurasystems.com/chrysler.htm (no month).

"Auragen™ Mobile Power Generator" ©1998 Aura Systems, Inc., @ http://www.aurasystems.com/auragen.htm (no date).

"Generator Comparison Table" ©1998 Aura Systems, Inc., @ http://www.aurasystems.com/gentable.htm (no month).

"Auragen will Simultaneously Power 5000W of Equipment-"(diagram) ©1998 Aura Systems, Inc., @ http://www.aurasystems.com/gen_diag.htm (no month).

MULTIPLE VOLTAGE ALTERNATOR SYSTEM

BACKGROUND OF THE INVENTION

1. Field of the Invention

This invention relates to vehicle electrical systems in which more than one DC voltage is required. More particularly, this invention relates to DC to DC converters used in the power management system of multiple voltage vehicles for managing the power available from the vehicle alternator and the battery, and for directing and redistributing the available power to loads requiring different DC voltages.

2. Description of Related Art

Most vehicles that are presently available operate with a nominal 12 volt DC electrical power system to run the various accessories, fans, wipers and other electrically operated components. The number of components and the power needed to operate them has been increasing and it is expected that this trend will continue. A new generation of engines which use electromagnetically operated engine valves to improve vehicle efficiency will require even more electrical power.

When supplying high power at 12 volts, the current carried by the vehicle wiring is significant, and this high current results in a substantial resistive power loss through the wiring. To minimize this loss, it is possible to decrease the wiring resistance by increasing the diameter of the vehicle wiring, but large diameter wiring is expensive. Large diameter wiring also consumes valuable space within the vehicle and can be difficult to install. For all of these reasons, there has been an increased interest in using higher DC voltages in vehicles.

Although conventional vehicle power systems are commonly referred to as 12 volt systems, those skilled in this art will recognize that the actual voltage provided by these systems is about 14 volts when the vehicle alternator is turning. The 14 volt output of the alternator allows the nominal 12 volt battery to be fully charged. Higher voltage systems that are most commonly considered use multiples of the basic 12/14 volt system, such as a multiple of three forming a 36/42 volt system or a multiple of four providing a 48/56 volt system, etc. Hereafter, these dual labels of 12/14, 36/42, 48/56 volts, etc. will be used where appropriate.

Although higher voltage systems have significant advantages for high power consuming components, for low power consumption accessories the conventional 12/14 volt DC power is more suitable. In order to remain compatible with the present industry standard 12/14 volts, it is contemplated that 12/14 volt electrical systems will be required in all vehicles in addition to the higher DC voltage system.

It is also desirable for the vehicle to be able to supply conventional 110 volt AC. This allows household appliances to be operated in the vehicle and for the vehicle to be used as an emergency power source.

One approach to providing multiple DC voltages is to use a separate battery for each DC voltage needed. Multiple batteries are heavy, and relatively expensive, however, as compared to the weight and cost of current single battery systems.

Another disadvantage of multiple batteries is that each battery requires an independent and reasonably precise voltage control system to ensure rapid and complete recharging of the battery while avoiding battery damage due to overvoltage or excessive discharge. Separate alternators can be used to meet this need for charging each battery and regulating the charging voltage, but the significant cost and complexity makes this approach unfeasible.

A single alternator with multiple output windings, one for each voltage, may also be considered for producing the multiple voltages for multiple batteries. However, such a design must address the problem of uncorrelated variable loads on each battery at the different voltages. It is generally not possible to provide precise enough voltage regulation for each separate battery by adjusting the current to a single field winding in such an alternator. Any individual battery could be controlled precisely, or a weighted sum of the separate battery voltages could be regulated precisely, however, unbalanced loading would lead to poor battery voltage control and shortened battery life if limited to a single alternator and regulator.

Multiple voltage systems employing a single multiple output winding alternator can be used in single battery power systems as the output winding supplying the battery voltage can be carefully regulated by controlling the alternator field winding. The more modest regulation on the other outputs would normally be acceptable if no batteries are present on these outputs. A difficulty can arise in this type of system, however, if multiple voltages are required when the engine is off. In this situation, only the single battery voltage would by available prior to engine start.

This is particularly a problem with the latest high efficiency vehicle engine designs which use electromagnetically operated engine valves. These valves must be powered in order to start or run the engine. Electromagnetically driven engine valves consume power at a rate which is roughly proportional to the vehicle engine speed. At low speeds as the engine is started, these valves consume relatively little power and consume progressively more as the engine speed increases. Multiple voltage alternator systems for vehicles have not previously been designed to match this characteristic requirement for electromagnetically operated engine valves.

A related difficulty is that utilization of multiple winding alternators can lead to alternator inefficiencies. This comes about because the alternator is not operated in the most efficient manner unless the power loads on each winding track each other. Unfortunately, the loads on the different voltages do not normally track each other. An alternator is most efficient if all the power is converted on a single three phase winding at the highest voltage as this minimizes diode losses.

An auxiliary converter can be utilized to create the other system voltages, however, such converters have generally employed power modulation techniques to provide the required regulation for multiple batteries. These power modulation techniques generally require power filtering elements such as chokes and aluminum electrolytic capacitors. Suitable filtering capacitors are also expensive and have temperature limitations making under the hood operation less feasible.

Bearing in mind the problems and deficiencies of the prior art, it is therefore an object of the present invention to provide a multiple voltage alternator system requiring only a single battery.

It is another object of the present invention to provide a multiple voltage alternator system incorporating a simple DC to DC converter which does not require expensive filtering capacitors and where the vehicle starter is powered directly from the battery and does not require current supplied by the DC to DC converter.

It is another object of the present invention to provide a multiple voltage alternator system having a nominal 12/14 volts DC as one of the output voltages so that the extensive 12/14 volt vehicle equipment currently in use is not made obsolete.

A further object of the invention is to provide a multiple voltage alternator system which is capable of automatic DC to DC voltage conversion wherein power flows bi-directionally through the DC to DC converter from the low voltage side to the high voltage side and back as necessary depending upon the load requirements for each voltage.

It is yet another object of the present invention to provide a multiple voltage alternator system in which a conventional low voltage battery can be used during starting and for supplying initial power to electromagnetically operated valves in a vehicle engine and in which the alternator output windings are designed for higher voltage operation and provide higher electromagnetic engine valve power at a higher voltage as the vehicle engine speed increases and more power is required.

Yet another object of the present invention is to provide a multiple voltage alternator system that can provide 110 volt 50/60 Hz AC power.

Still other objects and advantages of the invention will in part be obvious and will in part be apparent from the specification.

SUMMARY OF THE INVENTION

The above and other objects, which will be apparent to those skilled in art, are achieved in the present invention which is directed to a multiple voltage alternator system for directing power between an alternator, a battery and loads connected thereto which require power at a higher DC voltage and a lower DC voltage. In one embodiment of the invention, the system includes a higher DC voltage output, a lower DC voltage output, and a transformer having first and second windings. The transformer couples together first and second bi-directional converters, and the converters are controlled by a switching controller that switches at a desired frequency.

The first bi-directional converter is connected to the higher DC voltage output and the first winding of the transformer. It produces the higher DC voltage by rectifying the higher AC voltage of the first transformer winding when power is flowing from the second winding to the first winding. The first converter produces the higher AC voltage by chopping the higher DC voltage at the frequency produced by the controller when power is flowing from the first winding to the second winding of the transformer.

The second bi-directional converter operates synchronously with the first converter, switching at the same frequency as the first converter. The second converter is connected to the lower DC voltage output and to the second winding of the transformer. The second converter produces the lower DC voltage by rectifying the lower AC voltage of the second winding of the transformer when power is flowing from the first winding to the second winding. The second converter produces the lower AC voltage by chopping the lower DC voltage when power is flowing from the second winding to the first winding of the transformer.

In the preferred embodiment, the first bi-directional converter includes first and second pairs of switches arranged in a bridge configuration which are switched in opposition by the switching controller. The second bi-directional converter preferably includes only two switches connected to first and second control outputs of the switching controller, and these two switches are switched in opposition by the switching controller synchronously with the switching of the first and second pairs of switches in the first bi-directional converter.

In this preferred design, the second winding of the transformer is a center-tapped winding. The switching controller preferably switches the first and second bi-directional converters at a frequency of between 2 and 10 kilohertz to minimize size, weight and cost of the transformer.

In the preferred bridge design of the first converter, the first pair of switches includes a first upper switch and a first lower switch and the second pair of switches includes a second upper and a second lower switch. The first upper switch is connected to the second upper switch at one end and to the second lower switch at an opposite end, the second upper switch is connected to the first upper switch at one end and to the first lower switch at an opposite end, and the first winding of the transformer is connected at one end to the first upper switch and the second lower switch and at an opposite end to the second upper switch and the first lower switch.

In an alternative embodiment of the invention, the multiple winding transformer used to couple the first and second converters is replaced by an autotransformer with multiple voltage taps. The autotransformer can be smaller, lighter and less expensive than a conventional transformer, and allows a reduction in the number of expensive power transistors needed in the DC to DC conversion.

In one aspect of the invention, the higher DC output voltage is above 30 volts, preferably between 42 and 56 volts which is suitable for many higher DC voltage tasks, without shock hazard. In another aspect of the invention, the higher DC voltage is above 100 volts, preferably in the vicinity of 130 to 165 volts to operate a chopping type of inverter producing household type 110 to 120 volt AC power to drive conventional AC powered devices.

Yet another embodiment of the invention is particularly adapted for use with vehicles that have high power requirements when the engine is operated at high speed, but relatively low power requirements as the engine is started. In this embodiment the invention provides unidirectional down conversion from a higher DC voltage to a lower DC voltage, but allows power flow in the reverse direction via direct diode coupling from the lower voltage to initially operate loads, such as electromagnetic engine valves, that are capable of running at low voltage and low power as needed to start the engine, but which later require higher voltage and higher power to operate when the engine reaches idle speed and beyond.

Another embodiment of this down conversion design emplys active rectification to improve efficiency.

BRIEF DESCRIPTION OF THE DRAWINGS

The features of the invention believed to be novel and the elements characteristic of the invention are set forth with particularity in the appended claims. The drawings are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
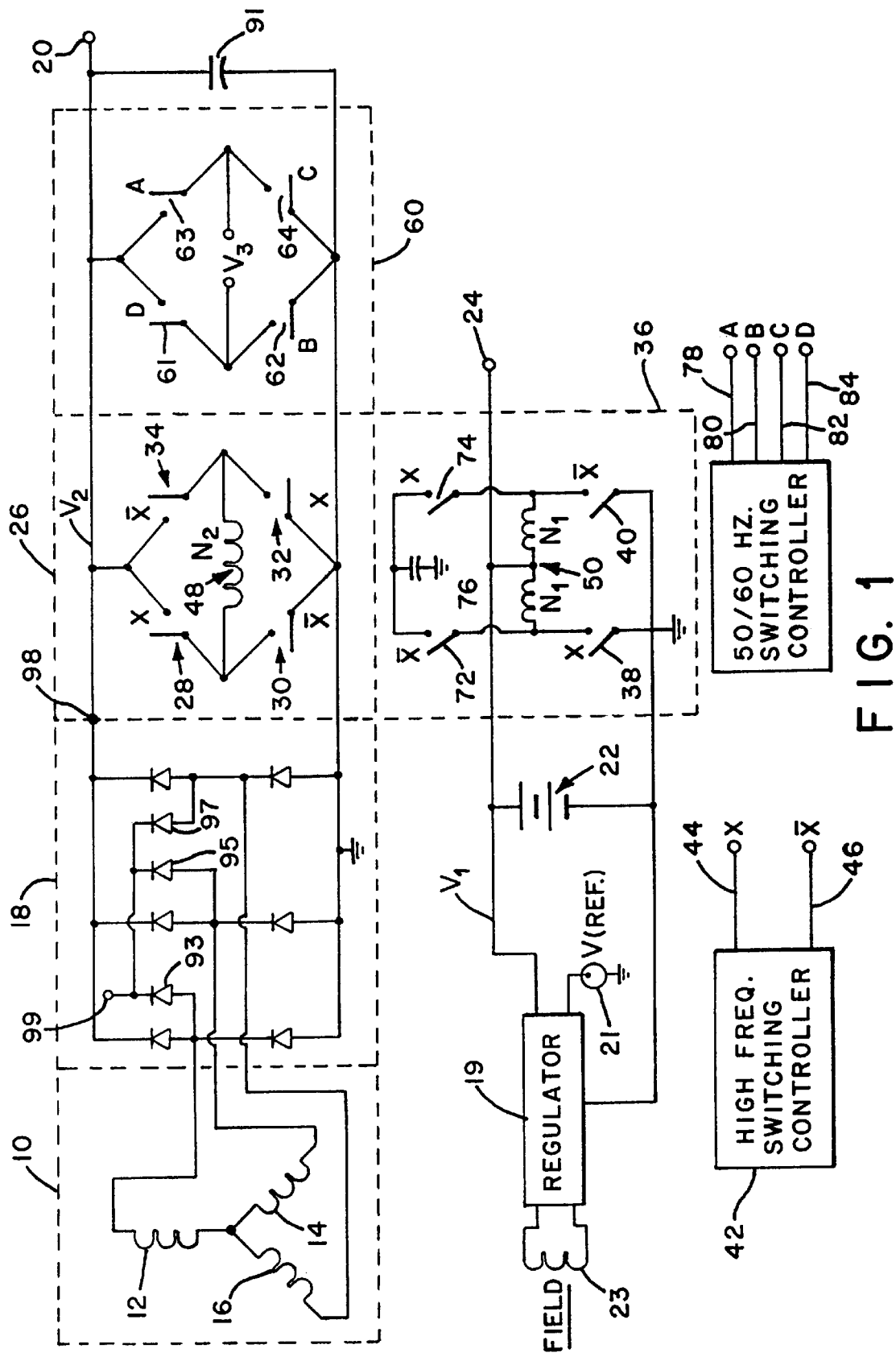
FIG. 1 is a circuit diagram of a first embodiment of a multiple voltage alternator system with single battery according to the present invention in which a bi-directional DC to DC converter using a conventional two-winding transformer coupling a pair of bi-directional DC to AC converters is used to transfer power automatically and bi-directionally between a lower DC voltage bus having the battery thereon and a higher DC voltage bus being supplied by the alternator. An optional AC inverter is also shown.

Referring to FIG. 1, an alternator having a stator winding 10 with three winding legs 12, 14 and 16 producing a three phase AC output is connected to a three phase full wave rectifying bridge 18. The basic design shown in FIG. 1 of the alternator winding 10 and the bridge rectifier 18 is conventional. However in the preferred embodiment, the windings 12, 14 and 16 will produce a higher voltage than is produced by a conventional alternator for a 12/14 volt auto motive system. The full wave bridge rectifier 18 will be suitable for rectifying this higher voltage.

The bridge rectifier 18 is also shown with a secondary high voltage output 99 that is diode isolated by diodes 93, 95 and 97 from the output at 98. High voltage DC loads that are connected to output 99 will be driven only after the alternator begins to turn, and cannot place any load on the high voltage output of the DC to DC converter. This allows high voltage loads to be segregated between those that are necessary for engine starting, or which must be operated from the DC to DC converter with the engine off, and those which do not need to be supplied until after the engine is operating.

The output 98 from the e bridge rectifier 18 (which is directly connected to output 20) will be a relatively high DC voltage, as compared to the standard 12/14 volts DC of conventional automobiles. In one aspect of the preferred design, this output will be a nominal 24/28, 36/42 or 48/56 volts to create multiples of 2×, 3× or 4× the current standard voltages. In another aspect of the design, this DC voltage will be higher, allowing the output to be chopped for the production of simulated conventional 110 volt AC power, suitable for powering conventional 110 volt AC devices. The chopped waveform will be formed as either a square wave or, more preferably, as a modified sine wave.

The higher DC voltage output 20 is connected to the higher DC voltage load which may include electromagnetically operated engine valves and other high power vehicle components. A lower DC voltage output 24 provides power to the vehicle at the lower DC voltage, typically 12/14 volts, to operate the radio and other conventional 12/14 volt components. The lower DC voltage output 24 is connected to battery 22. It will be noted that all the embodiments of the present invention need only a single battery 22, and that in the preferred designs the battery used is a conventional 12/14 volt battery.

The low voltage DC output 24 and the high voltage DC output 20 are interconnected by a pair of bi-directional DC to AC converters 26, 36 that form the power management system of this invention. Together, these bi-directional DC to AC converters form a single bi-directional DC to DC converter. Power flows automatically back and forth through the coupled DC to AC converters as necessary to supply power to the low voltage side or the high voltage side. During starting power will flow from the low voltage side to the high voltage side as the battery 22 provides high voltage DC to output 20 to, for example, operate the electronic valves. Once the engine is started, power will flow in the opposite direction through the converters as the alternator provides power to recharge the battery 22 and run low voltage accessories.

This reversing power flow is the result of the design of the bi-directional converters. Power flows through the converters from either power source (alternator or battery) to either load (high voltage DC or low voltage DC) as needed without regard to the source of the power. Typically, the engine starter, which has a very high power requirement will be operated at the same voltage as the battery to minimize demands on the DC to DC converter.

It will be noted that no control electronics or sensors are needed in this design to determine where power is needed or to direct the flow of this power. The converters 26, 36 free-run and the power flow is automatic. The free running and automatic power flow characteristics of the invention, coupled with the fact that only a single battery is used, allows a single voltage regulator to be used in connection with the alternator.

The voltage regulator may be entirely conventional and the voltage regulation sense point should be on the battery side to precisely control the voltage used to charge the battery.

FIG. 1 illustrates a conventional voltage regulator 19 monitoring the output 24 by comparing the output voltage to a reference voltage 21. The alternator output is increased or decreased by the regulator 19 by adjusting the voltage applied to the alternator rotor winding 23. The alternator used with this invention may be any desired type of alternator including a conventional Lundell type alternator or a hybrid design using permanent magnets and windings.

The first bi-directional converter 26 includes four switches 28, 30, 32 and 34 arranged in a bridge configuration. The second bi-directional converter 36 includes fifth and sixth switches 38, 40. All six of these switches are semiconductor switches, preferably power MOSFETs and in the preferred design, they switch synchronously at a constant switching frequency under the control of the high frequency DC to DC converter switching controller 42.

The individual semiconductor switches 28, 30, 32, 34, 38 and 40, in the bi-directional converters must be able to conduct current in both directions. A MOSFET type power switch is preferred for these switches as the MOS power devices inherently contain an intrinsic anti-parallel diode allowing reverse conduction between drain and source even if the device is not turned "on" while the device is conducting backward. The MOSFET type device has a further advantage due to its ability to be turned "on" while conducting in this reverse direction. In this mode, with proper device selection, the voltage drop while conducting in reverse can be less than a diode drop which allows for improved efficiency. This is especially important when dealing with the lower voltage (i.e. 12/14 volt) power output.

The switching configuration illustrated in FIG. 1 automatically operates the MOSFETs in this "active" rectifier mode thus providing enhanced efficiency. On the higher voltage side, MOSFET devices can also be used. Alternatively, other components, such as insulated gate bipolar transistors (IGBT) devices, can be used with an appropriate anti-parallel diode to provide for the necessary reverse current flow. The active rectification made possible by the MOSFET is less important on the higher voltage side as the switching device forward and reverse voltage drops (loss) have less relative impact on the efficiency of this side of the circuitry.

The switching controller 42 free-runs continuously usually at a constant switching frequency and has a pair of outputs 44, 46 which are connected to control the switching of the six principal switches 28, 30, 32, 34, 38 and 40. Typically, these will be MOSFET devices or IGBT devices with anti-parallel diodes, as discussed above, however, other semiconductor devices may also b used.

The outputs 44, 46 are indicated in a general form as being suitable for driving the control leads of the six semiconductor switches to turn them on and off. It should be understood that there will be additional conventional circuitry (not shown) that will adjust the voltage levels for these drive signals, and which may slightly adjust timing or other characteristics of the drive signals as needed to match the particular device selected as the semiconductor switch.

The lower switches can usually be driven directly, however the upper switches may require more specialized, but still well known driver circuitry containing level translation. If the switches are power MOSFETs, the control leads will be the MOSFET gate leads, and the controller 42 will be a conventional freerunning oscillator with appropriate drivers to turn the MOSFET switches on and off. The design of such a free-running oscillator circuit with MOSFET drivers is entirely conventional and is not critical to the proper functioning of the circuit.

The frequency of the oscillator in switching control 42 controls the switching rate, and this frequency is preferably in the medium kilohertz range, preferably from about 2 kilohertz to about 10 kilohertz. For comparison with the low frequency 50/60 Hz switching controller 70, switching controller 42 is labeled the high frequency switching controller. As described below, the switching controller 42 is used to control the chopping of the DC voltages in the converters 26, 36, and this chopping is used to produce AC voltages that are changed between higher and lower AC voltages in a conventional transformer. The preferred frequency range ensures that the volume, mass and cost of the transformer will be relatively low. The circuit could be desired to operate at higher or lower frequencies.

Switching control output 44 is labeled X and output 46 is labeled $\overline{X}$ to indicate that these outputs switch in opposition. When output X is on, output $\overline{X}$ is always off and vice-a-versa. Output 44 is connected to control all the switches marked X (28, 32 and 38), and output 46 is connected to control all the switches marked $\overline{X}$ (30, 34 and 40). Thus switches 28, 32 and 38 all close when the opposite switches 30, 34 and 40 are opened and they open when the opposite switches are closed.

The free-running switching of the high frequency switching controller 42 continuously switches the switches in both the first bi-directional converter and the second bi-directional converter and the interaction of these two converters causes power to flow in whatever direction is necessary to supply the demands of loads applied to output 20 and output 24.

For example, when a high load is applied to higher DC voltage output 20, as occurs during starting of the vehicle (when the alternator 10 is not yet rotating), power will flow from battery 22 through the second bi-directional converter 36 to the first bi-directional converter 26 and out the higher DC voltage output 20.

Alternatively, when the engine is running and the alternator 10 is producing excess power at the output 20, power will flow from the first bi-directional converter 26 to the second bi-directional converter 36 and into the battery 22 to charge the lower DC voltage battery 22 or to supply power to the devices connected to the lower DC voltage output 24.

This forward and reverse flow of power through the bi-directional converters is accomplished without the necessity of controlling the switching rate or modulating the switching in any way. This results in a switching signal which produces relatively few harmonics and one which is relatively easy to filter through appropriate design. Although a constant frequency switching is preferred for its low cost, in some applications, it may be desirable to vary the switching frequency. The exact switching frequency is not critical, and a variable frequency can be used to spread out the noise energy caused by switching into the noise background, if desired. Pulse width modulation may be used in some applications to adjust the output voltage, but is not generally needed.

The first converter 26 is connected to the higher voltage winding 48 of a conventional transformer. The second converter 36 is connected to the lower voltage winding 50 of the same transformer. Power flows between the first converter 26 and the second converter 36 through the magnetically coupled windings 48, 50 of this transformer.

When the power is flowing from the second bi-directional converter 36 to the first bi-directional converter 26, switches 38 and 40 act to chop the lower DC voltage supplied by battery 22. This chopping action produces an AC voltage in winding 50. This lower AC voltage is boosted to a higher AC voltage in winding 48 by the transformer action between windings 50 and 48. The higher AC voltage in winding 48 is rectified by the continuous switching action of the four switches 28, 30, 32 and 34 to produce the higher DC voltage needed at output 20.

It will be seen that the switches in the first converter 26 are turned on and off in opposite pairs on opposite sides of the bridge circuit. The first pair comprising switches 28, 32 is switched by output 44 (X) and the second pair is switched by output 46 ($\overline{X}$).

When the engine is running and the alternator windings 10 are producing excess power at output 20, the battery 22 and low voltage devices connected to the lower DC voltage 24 are supplied with power by the reverse flow of power from that described above. When power flows in this direction, the four switches in the first bi-directional converter 26 act to chop the higher DC voltage at output 20 to produce a higher AC voltage in winding 48 of the transformer. This voltage is transformed to a lower AC voltage in winding 50. The lower AC voltage in winding 50 is then rectified by the switching action of switches 38, 40 to produce the lower DC voltage needed by battery 22 and at output 24.

The direction that power flows between the two converters depends solely on the respective loads applied to the two outputs 20, 24 and the power and voltage available from the two power sources, comprising the battery 22 and the rectified alternator output from bridge rectifier 18. It is not necessary to "control" the direction of this power flow or to steer it, as the circuit automatically divides it between the two outputs and holds the ratio of voltages between the higher and lower voltage sides according to the winding ratio on the higher and lower windings 48, 50 of the transformer.

The design of the second converter 36 is optimized through the use of the center-tapped transformer winding 50. This allows the use of only two power switches 38, 40 in the second converter 36. However, the second converter may also comprise a four switch bridge design with a single winding, similar to converter 26. Also a two winding design with switch pairs for each winding and other conventional bi-directional converter designs may be used.

Some of the high voltage loads may not be required during engine start. To reduce the power requirements and cost for upward voltage conversion these loads may be switched off during start. An alternate automatic method for removing the loads not required during start is to utilize three separate upper power diodes 93, 95, 97 which have their anodes tied to the phase windings as do the upper diodes of bridge rectifier 18 of FIG. 1. The cathodes are tied together at 99 to form a separate high voltage bus which is diode isolated from the original bus. This isolated output can be used for the high voltage loads not required during start. This could include the 50/60 Hz inverter 60 described below if it is not desired to allow the low voltage battery to drive the 110 volt AC output. A conventional output capacitor 91 is connected at output 20.

FIG. 1 also shows that the second converter 36 is provided with switches 72 and 74 as well as capacitor 76. In contrast to the power switches 38, 40, switches 72 and 74 can be relatively low power devices. They act to suppress the inductive voltage spike that occurs when the power switches 38, 40 operate. The energy from the these spikes, caused by the leakage inductance of transformer winding 50 is channeled into capacitor 76 and recovered. Switch 72 is switched by the $\overline{X}$ signal on output 46 of controller 42 and switch 74 is switched by the X signal on output 44 of controller 42. As is the case with the other switches driven by these signals, appropriate adjustment of the drive signals X and $\overline{X}$ may be needed to match the particular type of semiconductor switch chosen.

In the preferred design shown, winding 50 has $2N_1$ turns, with $N_1$ turns on either side of the center tap, and winding 48 has $N_2$ turns. The output voltages $V_1$ and $V_2$ on 20 and 24 will then be related as: $V_2 \approx (N_2/N_1)V_1$.

In one embodiment of the invention, the DC output voltage at 20 is above 36 volts, preferably about 42 to 56 volts. This provides a low shock hazard while still allowing good power delivery to vehicle components, particularly, to electromagnetically operated engine valves. In another embodiment of the invention, the DC voltage at 20 is above 100 volts, preferably about 130 to 165 volts. This allows the higher DC voltage at 20 to be chopped by inverter 60 to produce a single phase AC voltage having an RMS voltage of about 110 volts at $V_3$, i.e. conventional household power suitable for household appliances. The inverter 60 is entirely optional and would be used only when the higher DC voltage on output 20 is sufficiently high to allow an approximation of 110 volt AC power by chopping with the illustrated bridge circuit including switches 61–64.

The switches in inverter 60 are controlled by the 50/60 Hz switching controller 70 having outputs 78, 80, 82 and 84 providing control signals A, B, C and D. If the higher DC voltage is about 110 volts, then output voltage $V_3$ can be a square wave with control signals A and B turning on at the moment when control signals C and D turn off and vice-a-versa.

Alternately, inverter 60 can be operated in a modified sine wave mode with the sequence of switch closures being AB, BD, CD and BD and then repeating. To eliminate the third harmonic AB and CD "on" times would be equal and double the BD "on" times. The amplitude of the higher DC voltage bus 20 would be increased over that of the square wave situation to provide the proper RMS voltage output to approximate the 110 volt AC signal. These control schemes and the design of controller 70 are entirely conventional.

It should be noted that the output 50/60 Hz does not require a transformer if the alternator winding is floated which can save considerable size, weight and cost. Transformer isolation in windings 48 and 50 allows the vehicle's 12/14 v power to be grounded independent of the "house ground" on the 50/60 Hz output. In this situation the ground as illustrated on high voltage side of FIG. 1 would be replaced by house ground at the junction of switches 62 and 61.

Figure 2:
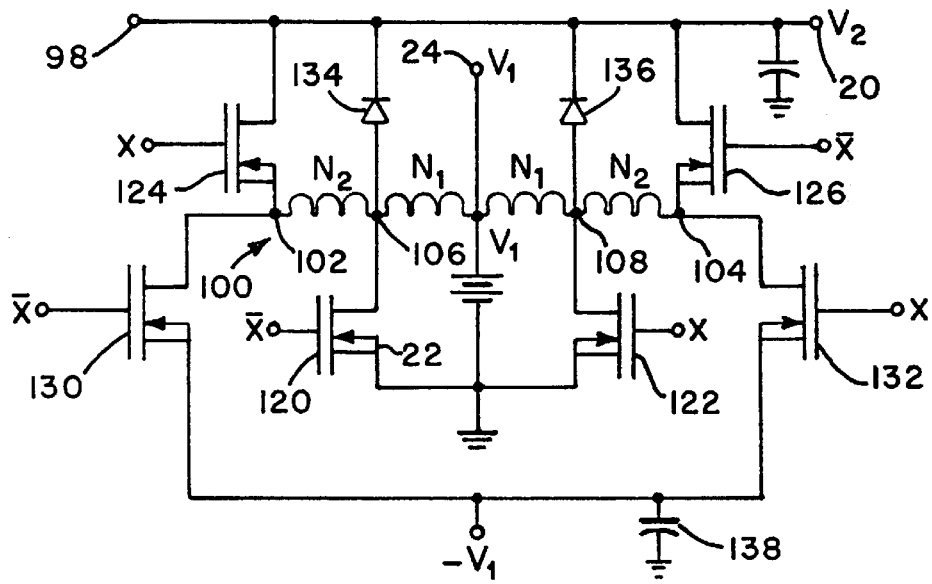
FIG. 2 is a circuit diagram of an alternative design for the bi-directional DC to DC converter of FIG. 1 in which an autotransformer is used to couple bi-directional DC to AC converters.

FIG. 2 illustrates an autotransformer circuit which may be used to replace the two converters 26 and 36 shown in FIG. 1. MOSFETs 124 and 126 generally correspond to the high voltage bi-directional converter 26 of FIG. 1, and MOSFETs 120 and 122 generally correspond to the low voltage bi-directional converter 36. This autotransformer design is especially applicable when the dual voltages on outputs 20 and 24 are within a factor of 2 to 4 of each other. One suitable design is to have $V_1$ (lower DC voltage) on output 24 set to the conventional 12/14 volts and $V_2$ (higher DC voltage) on output 20 set to about 42 volts. The design of FIG. 2 allows a reduction in the number of expensive power semiconductor switches and their current requirements as compared to the configuration of FIG. 1. In addition, the autotransformer configuration requires a smaller transformer for the same power output level.

For higher ratios of $V_2$ to $V_1$ (above 2 to 4), the autotransformer design is less suitable. Because $V_1$ will normally be 12/14 volts, and the optional inverter 60 shown in FIG. 1 requires a voltage typically above 100 volts, the inverter 60 would not normally be used with the autotransformer based circuit in FIG. 2 unless a 50/60 Hz output transformer is employed to provide the isolation eliminated by the autotransformer and to match output voltage to a lower $V_2$ voltage.

In the design of FIG. 2, autotransformer 100 includes $2N_1+2N_2$ total turns. There are $N_2$ turns between tap points 102 and 106 as well as between tap points 104 and 108. Center tap 24 corresponds to the center tap point in winding 50 of FIG. 1. There are $N_1$ turns between tap points 106 and 24 as well as between tap points 108 and 24. The output voltages $V_1$ and $V_2$ on outputs 20 and 24 are related as: $V_2 \approx (2+(N_2/N_1))V_1$. Consequently, if $V_1$ is about 14 volts and $V_2$ is about 42 volts, $N_2$ will equal $N_1$. The following example is based upon such a 14/42 volt design where $N_2$ equals $N_1$.

When the engine is stopped and MOSFETs 120 and 122 are conducting in the forward direction to step up $V_1$ to $V_2$, only two thirds of the current is needed in 120 and 122 (as compared to the current in switches 38 and 40 in FIG. 1) for the same output voltage and current at $V_2$ due to the autotransformer action. The current requirements in MOSFETs 124 and 126 is the same as in corresponding switches 28 and 34 in FIG. 1 for the same output voltage and current, but power switches 30 and 32 are eliminated. The voltage requirements on MOSFETs 124 and 126 (for the same output voltage) increase by one third as compared to the corresponding switches 28 and 34 in FIG. 1.

When the circuit of FIG. 2 is operating in a step down mode, 12/14 volt power at $V_1$ is obtained from 42 volts at $V_2$ produced by the alternator, and the current requirements on MOSFETs 124 and 126 are again the same as compared to the corresponding switches, 28 and 34, in FIG. 1 for equal output power. In this step down mode, reverse current in MOSFETs 120 and 122 is only two thirds that of the current in corresponding switches 38 and 40 of FIG. 1

MOSFETs 130 and 132, along with diodes 134 and 136 and capacitor 138 in FIG. 2 are utilized to recover the energy in the transformer leakage inductance in a similar manner to the functioning of switches 72 and 74 and capacitor 76 in FIG. 1. This not only improves circuit efficiency, it also reduces the voltage requirements on the semiconductor switches and allows higher frequency operation of the circuit to achieve minimum transformer size.

Figure 3:
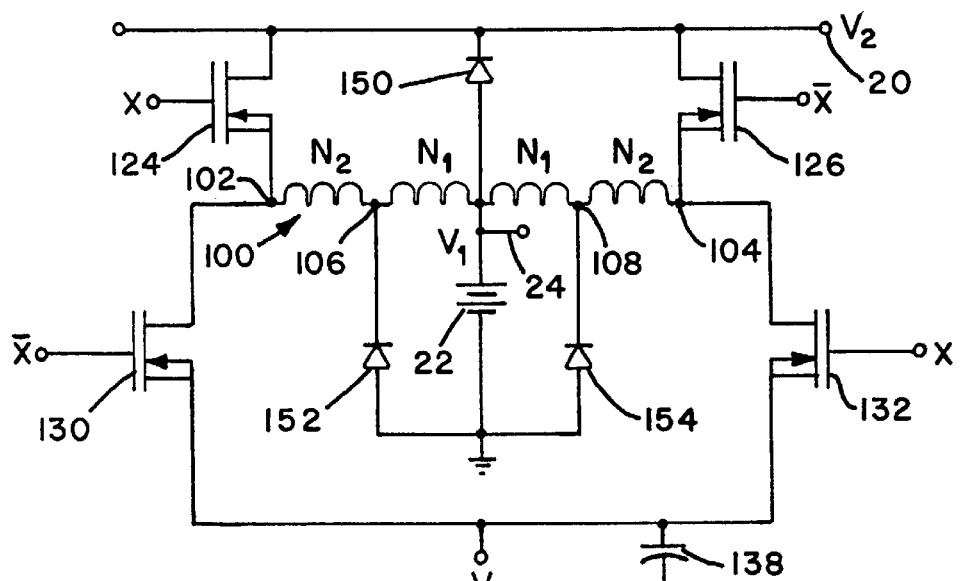
FIG. 3 is a circuit diagram of an alternative design to replace the bi-directional DC to DC converter circuit of FIG. 2. This circuit provides unidirectional down conversion from a higher DC voltage (produced by the alternator winding and rectifier circuit of FIG. 1) to a lower DC voltage, but allows power flow in the reverse direction via direct diode coupling from the lower voltage to initially operate for example electromagnetic engine valves that are capable of running at low volt age and low power as needed to start the engine. Higher voltage and higher power valve operation is provided at the alternator output as the engine reaches idle speed and beyond.

FIG. 3 illustrates a "down converter" only version of the autotransformer circuit of FIG. 2. In this design, the 12/14 volt battery of $V_1$ is charged from the 42 volt $V_2$ bus when the engine is running due to the step down action of autotransformer 100 in FIG. 3 and up conversion from battery voltage $V_1$ to the $V_2$ bus is not provided. Diode 150 of FIG. 3 (together with the intrinsic diodes of MOSFETs 124 and 126) serves as a lower DC voltage to higher DC voltage bypass circuit to couple the 12/14 volt battery into the 42 volt output before the engine starts. This provides power to loads requiring power during startup such as electromagnetic engine valves before the alternator begins to turn and produce the higher DC voltage through circuit 18. Normally the converter would be commanded off during this startup phase. Suitable, output stage design in the current controlled electronic valve driver circuitry allows utilization of a much lower supply voltage during start as actuator inductive and EMF effects (impedance) and required torque (current) all decrease with decreasing engine speed.

At very low engine speeds, actuator current is limited by supply voltage and actuator resistance alone. At maximum engine speed, actuator impedance is greatly increased as it is dominated by inductance and EMF effects. At higher engine speeds, higher actuator currents are also needed to produce the higher acceleration forces required. These factors combine to allow a significant voltage reduction during engine startup which can be provided by the 12/14 volt battery directly as the battery 22 in FIG. 3 directly supplies the $V_2$ bus to drive the engine valves. By the time the engine reaches idle speed, the alternator produces nearly full voltage for the valve supply so it is only during the initial start region where lower voltage operation is required.

In FIG. 3, MOSFETs 124 and 126 act as a down converter circuit. Power diodes 152 and 154 act as a rectifier circuit to produce the lower DC voltage needed by battery 22 from the lower AC voltage between center tap 24 and taps 106 and 108.

Power diodes 152 and 154 may be conventional power diodes, or Schottky diodes may be used to improve circuit efficiency due to their lower forward voltage drop. A further improvement in efficiency can be achieved by replacing diodes 152 and 154 of FIG. 3 by power MOSFETs configured in the same way as the MOSFETs 120 and 122 shown in FIG. 2. The power MOSFETs 120 and 122 are turned on by switching controller 42 during the time that corresponding diodes 152 and 154 would be forward biased, resulting in very low losses during this phase. In this configuration, the MOSFET's 120 and 122 are used for active rectification in the downward voltage conversion from $V_2$ to $V_1$, but do not chop the $V_1$ voltage to provide upward voltage conversion as occurs with the design of FIG. 2.

This unidirectional voltage conversion operation with the design of FIG. 2 is achieved by inhibiting FETs 120 and 122 from conducting in the forward direction, as normally occurs during startup in FIG. 2, i.e., before the alternator is providing the $V_2$ voltage and while the power at that voltage is provided by upward voltage conversion from the $V_1$ battery supply. One way to achieve this inhibiting effect is with the circuit of FIG. 4 in which the $\overline{X}$ control signal to the gate of MOSFET 120 has been passed first to input 200 of AND gate 202. The second input 204 of AND gate 202 is attached to the output of comparator 206 which is connected to monitor the drain to source voltage on MOSFET 120.

When the drain to source voltage on MOSFET 120 is positive, the output of comparator 206 is low and AND gate 202 prevents the $\overline{X}$ control signal from turning on MOSFET 120. This creates a true active rectifier as MOSFET 120 is kept "off" except when conducting in the reverse direction. This reduces stress on the MOSFET 120 during start, and accordingly reduces the cost of this component.

Figure 4:
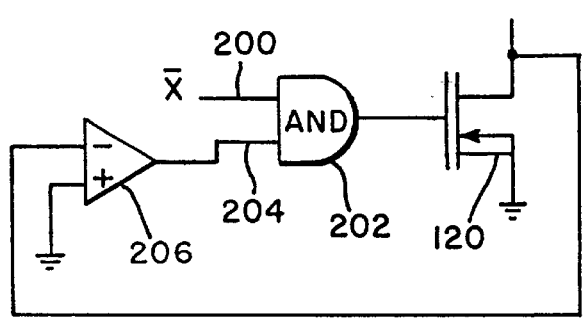
FIG. 4 shows an inhibitor circuit that may be used with the bi-directional DC to DC converter circuit of FIG. 2 to provide a circuit having the properties of FIG. 3 (unidirectional down voltage conversion), but with higher efficiency than provided by conventional diodes used in the design of FIG. 3.

A substantially identical circuit to that shown in FIG. 4 is used for MOSFET 122 in FIG. 2 to inhibit the X control signal from reaching the gate of that MOSFET, except that the $\overline{X}$ control signal at input 200 of AND gate 202 is replaced by the X control signal. Thus, two circuits of the type shown in FIG. 4 are used to turn MOSFETs 120 and 122 (of FIG. 2) into ideal rectifiers to replace the power diodes 152 and 154 in the rectifier circuit of FIG. 3.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
What is claimed is:

1. A multiple voltage alternator system for directing power between an alternator, a single battery and loads connected thereto which require power at a higher DC voltage and a lower DC voltage, the system comprising:

a higher DC voltage output;

a lower DC voltage output;

a transformer having first and second windings which allow power to flow bi-directionally therebetween, the first winding having a higher AC voltage when the second winding has a lower AC voltage;

a switching controller that switches at a desired frequency;

a first bi-directional converter controlled by the switching controller and connected to the higher DC voltage output and the first winding of the transformer, the first converter producing the higher DC voltage by rectifying the higher AC voltage of the first winding when power is flowing from the second winding to the first winding of the transformer and the first converter producing the higher AC voltage by chopping the higher DC voltage at the desired frequency when power is flowing from the first winding to the second winding of the transformer; and a second bi-directional converter operating synchronously with the first converter and controlled by the switching controller to switch at the same frequency as the first converter, the second converter being connected to the lower DC voltage output and the second winding, the second converter producing the lower DC voltage by rectifying the lower AC voltage of the second winding of the transformer when power is flowing from the first winding to the second winding and the second converter producing the lower AC voltage by chopping the lower DC voltage at the desired frequency when power is flowing from the second winding to the first winding of the transformer.

2. The multiple voltage alternator system of claim 1 wherein the first bi-directional converter includes first and second pairs of switches arranged in a bridge configuration.

3. The multiple voltage alternator system of claim 2 wherein:

the switching controller includes first and second control outputs that switch in opposition at the desired frequency; and the first and second pairs of switches are connected to the first and second control outputs of the switching controller and are switched in opposition by the switching controller.

4. The multiple voltage alternator system of claim 3 wherein the second bi-directional converter includes two switches connected to the first and second control outputs of the switching controller, the two switches being switched in opposition by the switching controller synchronously with the switching of the first and second pairs of switches in the first bi-directional converter.

5. The multiple voltage alternator system of claim 1 wherein the second winding of the transformer is a center-tapped winding.

6. The multiple voltage alternator system of claim 1 wherein the switching controller switches the first and second bi-directional converters at a frequency of between 2 and 10 kilohertz.

7. The multiple voltage alternator system of claim 1 wherein:

the first pair of switches includes a first upper switch and a first lower switch;

the second pair of switches includes a second upper and a second lower switch;

the first upper switch is connected to the second upper switch at one end and to the second lower switch at an opposite end;

the second upper switch is connected to the first upper switch at one end and to the first lower switch at an opposite end; and the first winding of the transformer is connected at one end to the first upper switch and the second lower switch and at an opposite end to the second upper switch and the first lower switch.

8. The multiple voltage alternator system of claim 1 wherein the higher DC output voltage is in the range of 42 to 56 volts.

9. The multiple voltage alternator system of claim 8 wherein the lower DC output voltage is suitable for operating nominal 12/14 volt automotive accessories.

10. The multiple voltage alternator system of claim 1 in combination with a hybrid permanent magnet and wound field alternator connected to the higher DC voltage output and a 12/14 volt battery connected to the lower DC voltage output.

11. The multiple voltage alternator system of claim 1 wherein the higher DC output voltage is above 100 volts.

12. The multiple voltage alternator system of claim 11 further including an inverter connected to the higher DC voltage output, and wherein the inverter chops the higher DC voltage to produce an AC voltage suitable for operating conventional household AC voltage devices.

13. The multiple voltage alternator system of claim 12 wherein the alternator includes a voltage regulator connected to monitor one of the DC voltage outputs, and wherein the AC voltage from the inverter is regulated by regulating said one of the DC voltage outputs.

14. The multiple voltage alternator system of claim 1 wherein the alternator includes a voltage regulator connected to monitor one of the DC voltage outputs.

15. The multiple voltage alternator system of claim 14 wherein the alternator includes a voltage regulator connected to monitor the lower DC voltage output.

16. A multiple voltage alternator system comprising:

a transformer having first and second windings, the first winding producing a higher AC voltage when a lower AC voltage is applied to the second winding and the second winding producing a lower AC voltage when a higher AC voltage is applied to the first winding;

a switching controller operating at a desired frequency;

a first bi-directional converter connected to the first winding, the first converter including first and second switches forming a first pair of switches and third and fourth switches forming a second pair of switches, the first and second pairs of switches being connected in a bridge configuration and the pairs of switches being oppositely switched by the switching controller at the desired frequency to produce a higher DC voltage by rectifying the higher AC voltage of the first winding when the lower AC voltage is applied to the second winding; and a second bi-directional converter connected to the second winding, the second converter including fifth and sixth switches, the fifth and sixth switches of the second converter being oppositely switched by the switching controller at the same frequency as, and in synchronism with, the first and second pairs of switches of the first converter, the first and second switches of the second converter acting to rectify the lower AC voltage of the second winding when the higher AC voltage is applied to the first winding to produce a lower DC voltage.

17. The multiple voltage alternator system according to claim 16 wherein:

the first pair of switches includes a first upper switch and a first lower switch, and the second pair of switches includes a second upper switch and a second lower switch;

the switching controller includes first and second outputs that provide opposite switch signals at the desired frequency;

each of the switches includes first and second ends and a control lead;

the first and second upper switches have their first ends connected together and their second ends connected to the first winding;

the first and second lower switches have their second ends connected together and their first ends connected to the first winding;

the first pair of switches has their control leads connected to the first output of the switching controller;

the second pair of switches has their control leads connected to the second output of the switching controller;

the fifth switch has its control lead connected to the first output of the switching controller; and the sixth switch has its control lead connected to the second output of the switching controller.

18. The multiple voltage alternator system of claim 16 wherein the higher DC output voltage is above 120 volts.

19. The multiple voltage alternator system of claim 18 further including an inverter connected to the higher DC voltage output, and wherein the inverter chops the higher DC voltage to produce AC power suitable for operating conventional household AC power devices.

20. A multiple voltage alternator system for directing power between an alternator, a single battery and loads connected thereto which require power at a higher DC voltage and a lower DC voltage, the system comprising:

a higher DC voltage output;

a lower DC voltage output connected to the battery;

a switching controller that switches at a desired frequency;

an autotransformer;

a first bi-directional converter controlled by the switching controller and connected to the autotransformer and the higher DC voltage output, the first bi-directional converter bi-directionally converting between the higher DC voltage and a higher AC voltage on the autotransformer; and a second bi-directional converter controlled by the switching controller and connected to the autotransformer and the lower DC voltage output, the second bi-directional converter operating synchronously with the first converter and bi-directionally converting between the lower DC voltage and a lower AC voltage on the autotransformer.

21. A multiple voltage alternator system for directing power between an alternator, a single battery and loads connected thereto which require power at a higher DC voltage and a lower DC voltage, the system comprising:

a higher DC voltage output;

a lower DC voltage output connected to the battery;

a switching controller that switches at a desired frequency;

a transformer for transforming a higher AC voltage to a lower AC voltage;

a converter controlled by the switching controller and connected to the transformer and the higher DC voltage output, the converter converting the higher DC voltage to the higher AC voltage on the transformer;

a rectifier circuit connected to the transformer, the rectifier circuit rectifying the lower AC voltage to the lower DC voltage to charge the battery; and a low voltage to high voltage bypass circuit connected between the lower DC voltage output and the higher DC voltage output to provide the lower DC voltage to the higher DC voltage output when the alternator is not providing power.

22. The multiple voltage alternator system of claim 21 wherein the transformer is an autotransformer.

23. The multiple voltage alternator system of claim 21 wherein the rectifier circuit is an active rectifier circuit controlled by the switching controller and operating synchronously with the converter.

24. The multiple voltage alternator system of claim 21 wherein the rectifier circuit is a diode.

25. The multiple voltage alternator system of claim 21 wherein the rectifier circuit is a Schottky diode.

* * * * *

UNITED STATES PATENT AND TRADEMARK OFFICE
CERTIFICATE OF CORRECTION

PATENT NO. : 6,111,768

DATED : August 29, 2000

INVENTOR(S) : William Curtiss

It is certified that error appears in the above-identified patent and that said Letters Patent is hereby corrected as shown below:

In column 2, line 26, after "would" delete "by" and substitute therefor -- be --.

In column 4, line 52, delete "emplys" and substitute therefor -- employs --.

In column 5, line 17, delete "volt age" and substitute therefor -- voltage --.

In column 5, line 37, delete "auto motive" and substitute therefor -- automotive --.

In column 5, line 52, after "from the" delete "e".

In column 6, line 34, delete "free running" and substitute therefor -- free-running --.

UNITED STATES PATENT AND TRADEMARK OFFICE
CERTIFICATE OF CORRECTION

PATENT NO. : 6,111,768
DATED : August 29, 2000
INVENTOR(S) : William Curtiss

It is certified that error appears in the above-identified patent and that said Letters Patent is hereby corrected as shown below:

In column 7, line 26, after "also" delete "b" and substitute therefor -- be --.

In column 7, line 40, delete "freerunning" and substitute therefor -- free-running --.

In column 11, line 16, after "Fig 1" insert -- . --.

Signed and Sealed this

Seventeenth Day of April, 2001

Attest:

NICHOLAS P. GODICI

Attesting Officer

Acting Director of the United States Patent and Trademark Office